United States Patent [19]

Wechsler

[11] Patent Number: 4,530,678
[45] Date of Patent: Jul. 23, 1985

[54] DERAILER MECHANISM

[76] Inventor: Joseph W. Wechsler, 925 Enchanted Way, Pacific Palisades, Calif. 90272

[21] Appl. No.: 570,166

[22] Filed: Jan. 12, 1984

[51] Int. Cl.³ .............................................. F16H 9/24
[52] U.S. Cl. ........................................ 474/81; 474/82
[58] Field of Search .................. 474/78, 79, 80–82; 280/261; 74/497, 567, 569

[56] References Cited

U.S. PATENT DOCUMENTS

| | | | |
|---|---|---|---|
| 3,901,095 | 8/1975 | Wechsler | 474/81 |
| 3,965,763 | 6/1976 | Wechsler | 474/81 |
| 4,443,208 | 4/1984 | Kozakae | 474/82 |

Primary Examiner—James A. Leppink
Assistant Examiner—Thuy M. Bui
Attorney, Agent, or Firm—Edward D. O'Brian; K. H. Boswell

[57] ABSTRACT

A particularly satisfactory derailer type bicycle can be constructed using front and rear derailer mechanisms in connection with the pedals and the rear wheel of the bicycle, respectively, and a control cable which operates these two mechanisms in synchronism with one another. This control cable is used so as to rotate a cam of the front derailer mechanism in order to cause shifting of the bicycle chain between the gears in this mechanism. Similarly the cable is used to concurrently rotate a cam of the rear mechanism so as to cause shifting of the bicycle chain between the gears of this mechanism. The cam as the rear derailer mechanism formed to facilitate the shifting action achieved by causing the chain of the bicycle to be moved slightly past and then back into a position corresponding to a gear of the rear mechanism.

9 Claims, 9 Drawing Figures

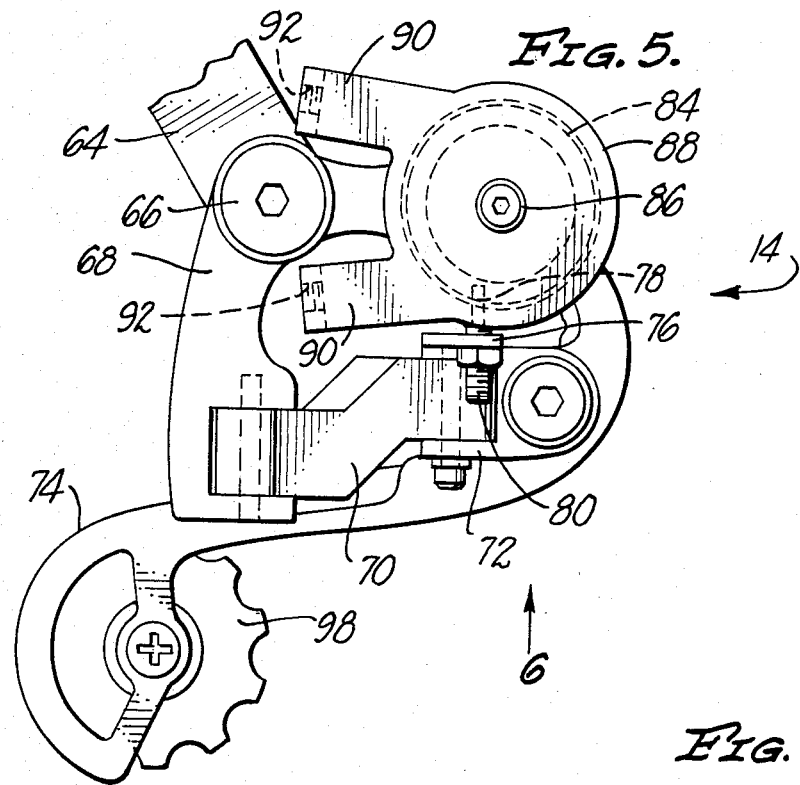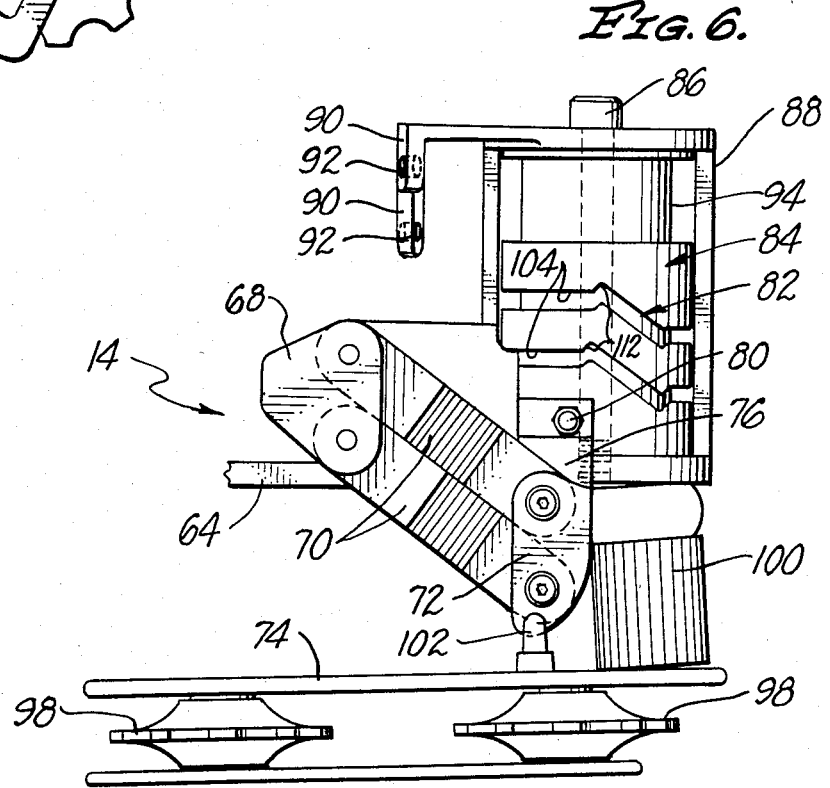

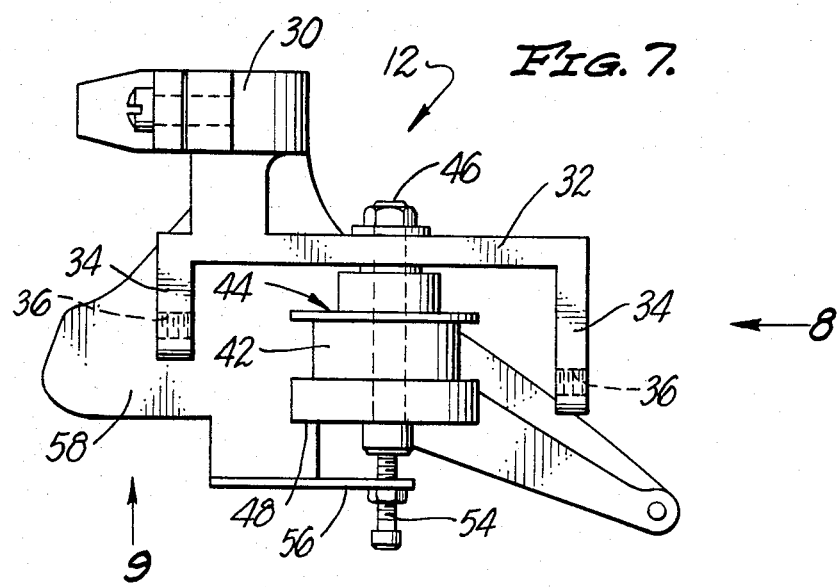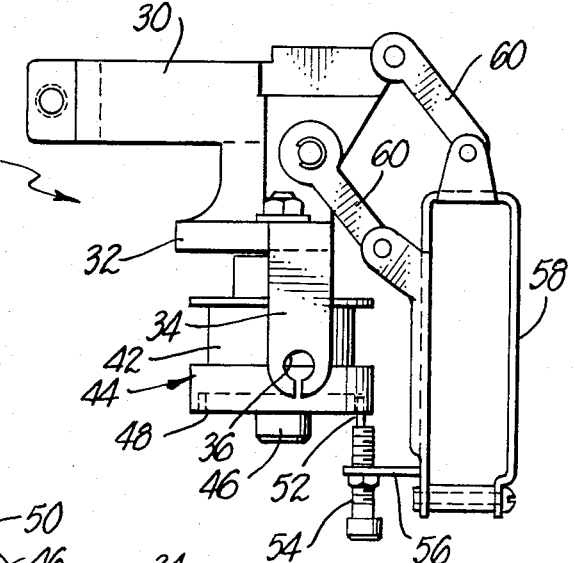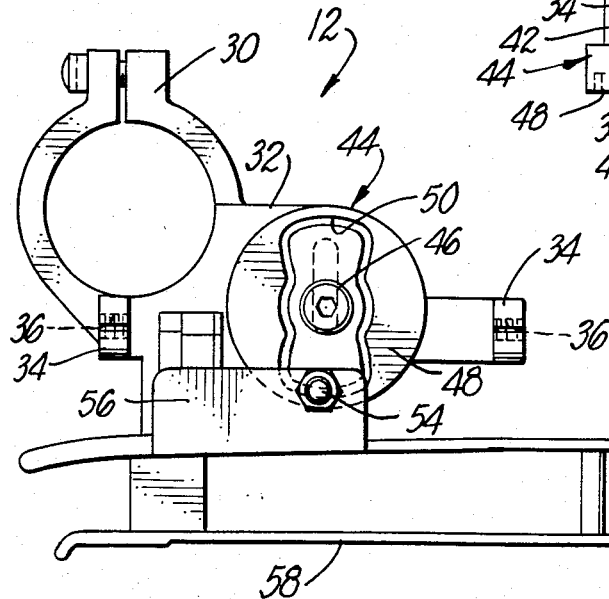

DERAILER MECHANISM

BACKGROUND OF THE INVENTION

This invention pertains to new and improved derailer mechanisms and to a specialized cam used in such mechanisms. More specifically it is directed towards derailer mechanisms which are incorporated and used as a part of bicycles.

Because of the various meanings in English of the work "derailer" it is considered necessary to clarify the manner in which this word is used in this specification. This particular word "derailer" was apparently adopted into the English language from French in the mid 1800's to designate a mechanism for removing a wheel from a rail or for removing several wheels from a set or pair of rails. As time has progressed this term "derailer" has been used in English to designate a mechanism for shifting a flexible belt, chain or the like from a first gear or similar member to an adjacent coaxial gear or similar member. The word "derailer" is also utilized to designate the precise structure within such a mechanism which engages and physically re-positions such a belt, chain or the like.

Derailer mechanisms have been commonly employed for many years in connection with bicycles so as to allow the users of such bicycles to vary the particular mechanical advantage associated with the operation of these bicycles. Frequently this is expressed by indicating that a derailer mechanism provides the user of a bicycle with a selection of different gear-ratios sufficient to facilitate the use of the bicycle. It is rather common to describe any bicycle provided with a derailer mechanism for a purpose as indicated as a "derailer" even though the bicycle itself will normally utilize two different derailer mechanisms—one in association with the pedals of the bicycle and the other in association with the rear wheel of the bicycle.

The various prior derailer mechanisms used in connection with bicycles have been constructed a number of different ways. Many of such mechanisms have utilized two different, separate controls, one of which is associated with one of the derailer mechanisms and the other of which is associated with the other of such mechanisms. When used, these two separate different mechanisms had to be manipulated in synchronism with one another so as to avoid any possible interference with the operation of the bicycle. A recognition of the problems associated with this had lead to the development of gear shift mechanisms in which two separate derailer mechanisms or structures are concurrently operated through the use of a single control cable. This use of such a single control cable is highly desirable in that it effectively eliminates the need for coordination in shifting a derailer type bicycle as was required with prior common place structures having two different controls for separately manipulating the two different shifter mechanisms on a bicycle.

In spite of the obvious advantages of derailers employing a single manipulative control as discussed in the preceding it is believed that there is a need for improvement in the field of derailer mechanisms and more specifically in the field of derailer type bicycles equipped with several such mechanisms. Specifically it is considered that there has been a continuing need for derailer mechanisms where are more economical than prior type derailer mechanisms. Further, it is considered that there is a continuing need for derailer mechanisms which are characterized with the ease in which they may be shifted as they are operated. This latter is quite important because the acceptability of a desirable mechanism or structure is frequently dependent upon the "smoothness" with which the mechanism may be shifted and upon the minimization of any possible complications during the operation of a derailer mechanism.

BRIEF SUMMARY OF THE INVENTION

From the foregoing it is believed that it will become apparent that the invention is intended to provide new and improved derailers or derailer mechanisms. More specifically, the invention is intended to provide derailer mechanisms which are more economically advantageous than prior related structures. The invention is also intended to provide derailer mechanisms which may be easily and conveniently shifted in a comparatively "smooth" manner during the use of these mechanisms. The invention is further intended to provide derailer mechanisms as noted which may be utilized over a relatively prolonged period with little or no maintenance. In addition, the invention is intended to provide derailer mechanisms as herein described which are incorporated as part of the "drive train" of such a bicycle. The invention is also intended to provide new and improved cams which are primarily intended for use in derailer mechanisms as described.

In accordance with this invention those objectives of the invention which are directed specifically to a derailer mechanism, per se, are achieved by providing in a derailer mechanism intended for use with a bicycle, said mechanism having front and rear gear sprocket clusters, an endless chain extending between said gear clusters, front and rear chain shifters for use in shifting said chain between specific gears of said front and rear clusters, respectively, front and rear cam means for controlling the positions of said front and rear chain shifters relative to front and rear sprockets, respectively, front and rear cam follower means engaged with said front and rear cam means, respectively, said front and rear cam follower means being also connected to said front and rear chain shifters, respectively, and control means for concurrently operating said front and rear cam means in order to vary the positions of said front and rear chain shifters in synchronization with one another in which the improvement comprises: said rear cam means includes cam path segments for use in holding its associated follower and the chain shifter connected thereto relative to each of the gears on said rear cluster, and other cam path segments connecting said fist mentioned path segments for causing movement of said follower and its associated chain shifter in order to move said chain between successive gears of said rear gear cluster, and extension means located between said two types of cam path segments so as to move said rear chain shifter so that it goes past a position corresponding to one of the gears of said rear cluster and then back to a position corresponding to said one of said gears as said derailer mechanism is used to shift said chain between adjacent gears on said rear gear sprocket.

Those objectives of the present invention which are specifically directed to a type of cam for use in a derailer mechanism are achieved by providing a cam intended for use in a derailer mechanism which cam includes a cylindrical member having a cam path means located so as to extend around its periphery in which the improvement comprises: said cam path means comprising a plurality of circumferentially extending path segments located in planes perpendicular to the axis of said cylindrical member and diagonal path segments joining adjacent ends of said circumferential path segments so as to constitute a linear cam path having ends which extend around the periphery of said cylindrical member, and extension means located at each junction between a circumferential path segment and a diagonal path segment, said extension means being shaped so that during rotation of said cylindrical member said extension means will cause a follower guided by said cam path means to move diagonally beyond a circumferential path segment in passing from a diagonal path segment to a circumferential path segment when the follower is being moved so as to engage said circumferential path segments.

Further, the invention is also intended to provide derailer type bicycles in which such derailer mechanisms including the cams are used. It is considered that these mechanisms make such bicycles particularly desirable for use by contributing to the economics of such a derailer-type bicycle and by, in addition, attributing to the ease of shifting and the reliability of a derailer mechanism forming a part of a derailer mechanism in a bicycle.

BRIEF DESCRIPTION OF THE DRAWINGS

Because of the nature of this invention it is best more fully described with reference to the accompanying drawings in which:

FIG. 5 is an elevational view of the rear derailer illustrated in the preceding FIGS. 1 and 2, this view showing the derailer from the same direction as it appears in FIG. 1 but showing the chain tension mechanism in a different position than it appears in FIG. 1;

FIG. 6 is a semi-diagrammatic view taken in the direction of the arrow 6 in FIG. 5;

FIG. 7 is a side elevational view of the front derailer illustrated in FIGS. 1 and 2;

FIG. 8 is a rear elevational view of the front derailer taken in the direction of the arrow 8 in FIG. 7;

FIG. 9 is a bottom plan view of the front derailer taken in the direction of the arrow 9 in FIG. 7.

These various figures of the accompanying drawings are primarily intended for explanatory purposes in explaining the nature of the present invention. The invention itself involves essentially intangible concepts as are verbally set forth in the appended claims forming a part of this specification. These concepts may be easily utilized in a variety of differently appearing and differently constructed devices through the use or exercise of routine mechanical engineering skill. For this reason the accompanying drawings are not to be taken as limiting this invention in any respect.

DETAILED DESCRIPTION OF THE PREFERRED EMBODIMENT

Figure 1:
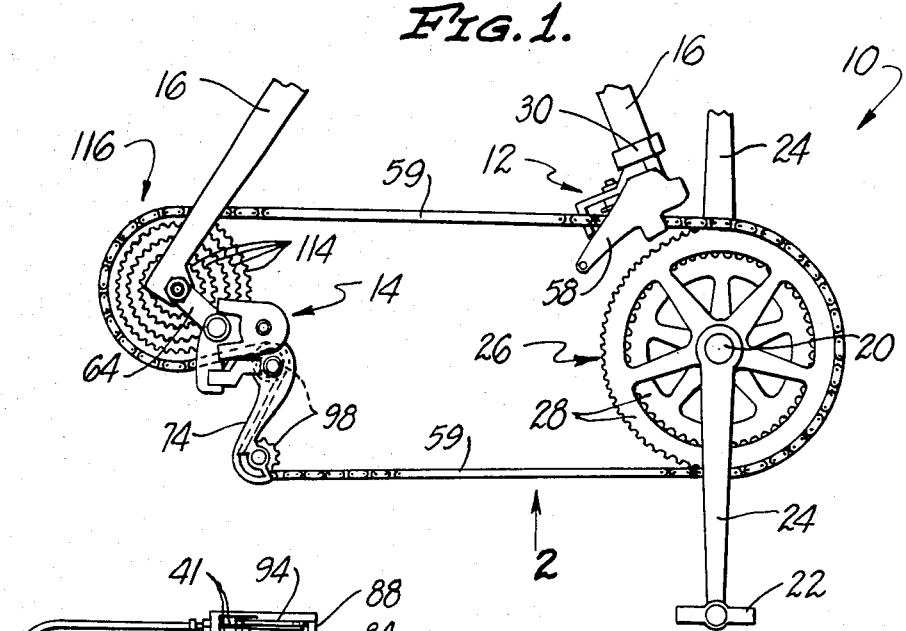
FIG. 1 is a fragmentary view showing a presently preferred embodiment or form of a bicycle drive mechanism as used on a "derailer" type of bicycle, this drive including separate front and rear derailers, this view omitting the control cable used with the mechanism illustrated.

In FIG. 1 of the drawings there is shown what may be described as a part of a "derailer" type bicycle 10 of the present invention utilizing a front derailer mechanism 12 and a rear derailer mechanism 14. This bicycle 10 utilizes a conventional frame 16, only parts of which are shown. This frame 16 supports a conventional bearing 18 which in turn holds a shaft 20 to which pedals 22 are attached by crank arms 24.

This shaft 20 holds a front gear cluster 26 forming a part of what may be regarded as the front derailer mechanism 12. This cluster 26 consists of two parallel gears 28 of different diameters which are located coaxially upon the shaft 20. It can include more than two gears. The front derailer mechanism 12 also includes a conventional clamp 30 which is used to hold a body 32 on the frame 16. The configuration of this body 32 is best seen in FIGS. 7, 8 and 9 of the drawings. It is of a somewhat composite configuration and includes ends 34 having internally threaded holes 36 which are adapted to hold in a conventional manner threaded fittings 38 on cable sheaths 40 so that the cable 41 extends around a drum 42 forming a part of a cam rotor 44. The cable 41 is secured to the drum 42 in a conventional manner (not shown).

Figure 4:
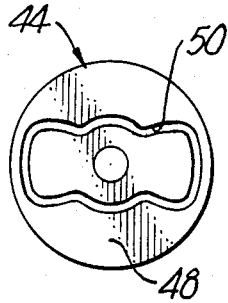
FIG. 4 is an elevational view showing the face of a cam used in the front derailer mechanism illustrated in the preceding FIGS. 1 and 2.

This cam rotor 44 is mounted for rotation about its axis (not shown) on the body 32 through the use of a conventional bolt type shaft 46. This cam rotor 44 is provided with a flat face 48 extending transverse to the bolt 46. In turn this face 48 is provided with a cam groove 50 as illustrated in FIG. 4 of the drawing. This cam groove 50 may be referred to as a cam path because of its function in connection with a follower 52.

This follower 52 is located on an adjustable bolt 54 as illustrated in FIGS. 7 and 8 of the drawing. This bolt 54 is carried by a small bracket 56 which extends from a somewhat tube-like conventional housing 58. At times this housing 58 is referred to as a derailer apart from the other mechanism described because of its function in engaging a bicycle chain 59 or similar member so as to tend to guide it from one of the gears 28 to the other of these gears 28 on the first cluster 26. If this first cluster 26 has more gears than this the housing 58 is used to guide such a chain into engagement with any of such gears.

This housing 58 is connected to the body 32 through the use of small links 60 which enable it to be pivoted in a parallelogram type manner relative to the body 32 as the follower 52 moves within the cam groove 50. Thus, this follower 52 and the cam groove 50 will determine the position of the housing 58 and, of course, any chain controlled by it at any one time. Such position of the cam groove 50 and, of course, the follower 52 is in turn determined by the relative position of the cam rotor 44 with respect to the body 32. This, in turn, is determined by the position of the cable 41 carried within the cable sheaths 40. This will be subsequently explained in more detail.

The rear derailer mechanism 14 is constructed in a somewhat different manner. As illustrated in FIG. 5 this rear mechanism 14 is carried by a bracket 64 secured to the frame 16 in a conventional manner. This bracket 64 is further secured through a conventional fastener 66 to a support frame 68 having a somewhat composite shape.

This frame 68 pivotally carries two links 70 which in turn support a bracket 72. This bracket 72 is secured to and carries a housing 74 which is related to the housing 58 described in the preceding. This bracket 72 also includes a small plate 76 which in turn carries another follower 78. This follower 78 is mounted upon the plate 76 through the use of a bolt 80 so that its position may be conveniently adjusted.

It normally fits within a cam 82 groove in a cylindrical cam member 84. This cam member 84 is mounted for rotation about its axis through the use of a bolt 86 extending between the frame 68 and a "cage" 88 mounted on this frame 68. Ends 90 are provided on the cage 88 so that further fittings 38 on cable sheaths 40 may be threaded into holes 92 on this end 90 so as to be secured in place. The cable 41 passes through the sheaths 40 and is wrapped around a cable drum portion 94 of the cam member 84 so that it can be used in rotating this cam member 84. A conventional fastener 96 is preferably used to secure the cable 62 to this drum 94.

The housing 74 is used to rotatively support several sprockets 98 which are engaged by the chain 59 when the rear derailer mechanism 14 is used. It is pivotally mounted on this bracket 72 through the use of a small conventional torque spring 100 serving to rotatably bias the housing 74 so that it normally will engage the chain 59 in order to hold it under tension. A small stop 102 may be provided on the housing 74 in a position in which it will engage the bracket 72 in order to limit the amount that this housing 74 can be rotated.

Figure 3:
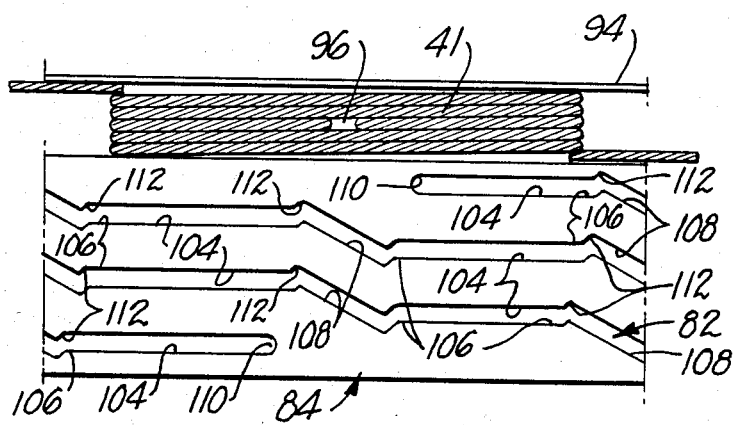
FIG. 3 is a stretched-out view of a cam as used in the rear derailer mechanism illustrated in the preceding figures.

The configuration of the cam groove 82 in the cam member 84 is quite important with the present invention. This cam member 84 is shaped so that the groove 82 contains a series of elongated path segments 104 which extend generally around the axis of the cam member 84 in planes perpendicular to the axis of this cam member 84. Various of these segments 104 are displaced from one another as shown in FIG. 3 of the drawings. The ends 106 of these segments 104 are connected through the use of other path segments 108 which extend more or less diagonally around the periphery of the segments 104. This construction results in the cam groove 82 being, in effect, a linear cam path having terminal ends 110 as shown in FIG. 3 of the drawings.

In order to improve the operation of the rear derailer mechanism 14 small extensions 112 are located generally between the segments 104 and 108 at locations where these segments join with one another. These extensions 112 are shaped more or less as notches as shown in FIG. 3. Their function is to provide an "override" type movement of the housing 74 which facilitates the shifting action achieved through the use of the rear derailer mechanism 14 so as to make this shifting action "smoother" and more reliable. These extensions 112 cooperate with the follower 78 in such a manner that as a housing 74 is being moved so as to shift the chain 59 from one gear 114 of the rear gear cluster 116 to an adjacent gear 114 the housing 74 will move the chain 59 a bit past a position in which the chain 59 extends substantially in the plane of the gear 114 to which it is being shifted. Then after this occurs, the extensions 112 will operate so as to move the cam follower 78 to a position in which the chain 59 extends substantially within the plane of the gear 114 to which it is shifted. This action is considered to be quite important.

Figure 2:
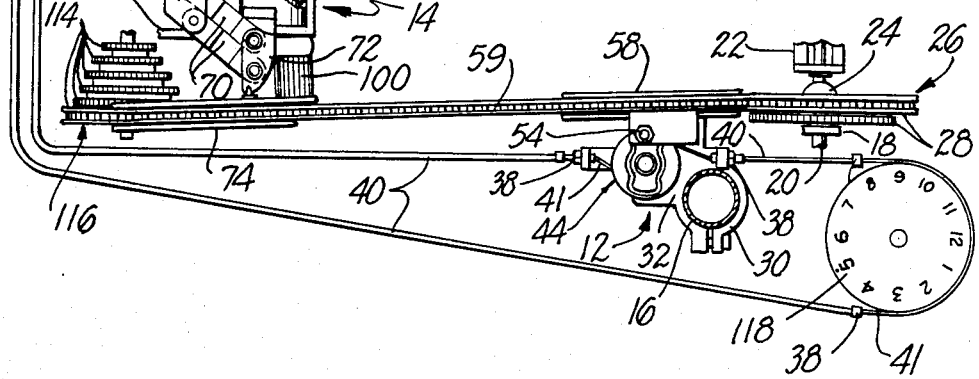
FIG. 2 is a semi-diagrammatical view in the direction of the arrow 2 in FIG. 1 showing the various operative parts of the bicycle drive illustrated in FIG. 1 including the control cable omitted from FIG. 1.

In the bicycle 10 quite a number of different gear-ratios can be achieved depending upon the desires of a user. As the bicycle 10 is employed a control drum or wheel 118 rotatively mounted upon the frame 16 in a conventional manner will be turned so as to move the control cable 41 within the sheaths 40. In order to achieve this movement it may be necessary to secure the cable 41 to this drum 118 in a conventional manner. Various numbers as shown in FIG. 2 are preferably provided on the drum 118 so as to show the user which of a series of relative gear-ratios is concurrently in use. As this motion of the cable occurs the cam rotors 44 and 84 will be rotated in synchronism with one another.

This will, of course, cause the followers 52 and 78 associated with these rotors 44 and 84 to move so as to effect or result in shifting of the chain 59 between various gears 28 and 114 of the clusters 26 and 116. The various numerals shown adjacent to the cam groove 50 in FIG. 4 and adjacent to the cam groove 82 in FIG. 3 show the positions of the followers 52 and 78 associated with these grooves 50 and 82 which correspond to various positions to the cable 41 indicating various different gear-ratios achieved through the use of the front and rear derailers 12 and 14. These numbers coordinate with those on the drum 118.

It is believed that it will be apparent from the preceding that a bicycle corresponding to the bicycle 10 described in the preceding possesses distinct advantages over prior related type derailer type bicycles. It is specifically noted that because of its configuration that the cam rotor 44 can be easily and conveniently manufactured at a comparatively nominal cost. It is also particularly noted that the use of the front derailer mechanism 12 in combination with the rear derailer mechanism 14 as described is particularly advantageous in obtaining a particular "smooth" shifting action in conjunction with the satisfactory performance.

I claim:

1. In a derailer mechanism intended for use with a bicycle, said mechanism having front and rear gear sprocket clusters, an endless chain extending between said gear clusters, front and rear chain shifters for use in shifting said chain between specific gears of said front and rear clusters, respectively, front and rear cam means for controlling the positions of said front and rear chain shifters relative to front and rear sprockets, respectively, front and rear cam follower means engaged with said front and rear cam means, respectively said front and rear cam follower means being also connected to said front and rear chain shifters, respectively, and control means for concurrently operating said front and rear cam means in order to vary the positions of said front and rear chain shifters in synchronization with one another in which the improvement comprises:

said rear cam means includes cam path segments for use in holding its associated follower and the chain shifter connected thereto relative to each of the gears on said rear cluster, and other cam path segments connecting said first mentioned path segments for causing movement of said follower and its associated chain shifter in order to move said chain between successive gears of said rear gear cluster, and extension means located between said two types of cam path segments so as to move said rear chain shifter so that it goes past a position corresponding to one of the gears of said rear cluster and then back to a position corresponding to said one of said gears as said derailer mechanism is used to shift said chain between adjacent gears on said rear gear sprocket.

2. A derailer mechanism as claimed in claim 1 wherein:
said rear cam means includes a cylindrical rotor, said cam path segments and said extensions being located in the periphery of said rotor, and
said cam path segments and said extension means constitute a single linear cam path having ends.

3. A derailer mechanism as claimed in claim 1 wherein:
said rear chain shifter is carried by said rear cam means so as to be concurrently movable therewith and is pivotally mounted and spring biased relative to said rear chain shifter so as to be capable of being moved to maintain said chain under tension.

4. A derailer mechanism as claimed in claim 1 wherein:
said front cam means comprises a cam rotor having a face extending perpendicular to the axis of said rotor and includes a cam path located within said face and extending around the axis of said rotor.

5. A derailer mechanism as claimed in claim 1 wherein:
said control means comprises a cable connected to both of said cam means.

6. A derailer mechanism as claimed in claim 1 wherein:
said control means comprises a cable connected to both of said cam means,
said rear cam means includes a cylindrical rotor, said cam path segments and said extensions being located in the periphery of said rotor,
said cam path segments and said extension means constitute a single linear cam path having ends, and
said front cam means comprises a cam rotor having a face extending perpendicular to the axis of said rotor and includes a cam path located within said face and extending around the axis of said rotor.

7. A derailer mechanism as claimed in claim 6 wherein:
said rear chain shifter is carried by said rear cam means so as to be concurrently movable therewith and is pivotally mounted and spring biased relative to said rear chain shifter so as to be capable of being moved to maintain said chain under tension.

8. A cam intended for use in a derailer mechanism which cam includes a cylindrical member having a cam path means located so as to extend around its periphery in which the improvement comprises:
said cam path means comprising a plurality of circumferentially extending path segments located in planes perpendicular to the axis of said cylindrical member and diagonal path segments joining adjacent ends of said circumferential path segments so as to constitute a linear cam path having ends which extend around the periphery of said cylindrical member, and
extension means located at each junction between a circumferential path segment and a diagonal path segment, said extension means being shaped so that during rotation of said cylindrical member said extension means will cause a follower guided by said cam path means to move diagonally beyond a circumferential path segment in passing from a diagonal path segment to a circumferential path segment when the follower is being moved so as to engage said circumferential path segments.

9. A cam as claimed in claim 8 wherein:
said cam path means comprises a series of grooves connected together into a linear cam path.

* * * * *